(12) United States Patent
Sigal

(10) Patent No.: US 8,739,034 B2
(45) Date of Patent: May 27, 2014

(54) METHOD AND SYSTEM FOR DOWNLOADING AND MANAGING AN EDITED MEDIA STREAM TO A PORTABLE MEDIA DEVICE

(75) Inventor: Jacob R. Sigal, Ferndale, MI (US)

(73) Assignee: Myine Electronics, LLC, Ferndale, MI (US)

( * ) Notice: Subject to any disclaimer, the term of this patent is extended or adjusted under 35 U.S.C. 154(b) by 852 days.

(21) Appl. No.: 12/503,421

(22) Filed: Jul. 15, 2009

(65) Prior Publication Data
US 2010/0042920 A1  Feb. 18, 2010

Related U.S. Application Data

(60) Provisional application No. 61/088,438, filed on Aug. 13, 2008.

(51) Int. Cl.
| | |
|---|---|
| *G06F 3/00* | (2006.01) |
| *G06F 9/455* | (2006.01) |
| *G06F 11/34* | (2006.01) |
| *G06F 3/01* | (2006.01) |
| *G06F 3/16* | (2006.01) |

(52) U.S. Cl.
CPC ........ *G06F 9/45512* (2013.01); *G06F 11/3414* (2013.01); *G06F 3/16* (2013.01)
USPC ............ 715/704; 715/716; 715/727; 715/728

(58) Field of Classification Search
CPC ... G06F 9/45512; G06F 11/3414; G06F 3/16; G06F 3/0481; H04N 5/44543
USPC .................. 715/704, 716, 727, 728
See application file for complete search history.

(56) References Cited

U.S. PATENT DOCUMENTS

| | | | | |
|---|---|---|---|---|
| 6,007,228 | A * | 12/1999 | Agarwal et al. ................. | 700/94 |
| 6,611,537 | B1 * | 8/2003 | Edens et al. .................. | 370/503 |
| 7,167,425 | B2 * | 1/2007 | Kudo et al. ................. | 369/47.12 |
| 7,424,708 | B2 * | 9/2008 | Andersson et al. ........... | 717/174 |
| 8,170,210 | B2 * | 5/2012 | Manders et al. .............. | 380/217 |
| 2004/0030798 | A1 * | 2/2004 | Andersson et al. ........... | 709/232 |

(Continued)

FOREIGN PATENT DOCUMENTS

KR    10-2007-0103575    10/2007

OTHER PUBLICATIONS

Written Opinion of the International Searching Authority and International Search Report for International Application No. PCT/US2009/053580, mailed Apr. 5, 2010.

*Primary Examiner* — Nicholas Augustine
(74) *Attorney, Agent, or Firm* — Harness, Dickey & Pierce, P.L.C.

(57) ABSTRACT

In one aspect the present disclosure is directed to a media system having a base unit and a portable media player. The base unit may be adapted to playback and record media content being received from an external media source. The base unit may further be adapted to analyze the media content and to automatically extract therefrom, without intervention by a user of the system, intermittent, designated portions of the media content as the media content is received by the base unit, and to store the designated portions of the media content as media files for subsequent playback. The portable media player may be docked to the base unit so that stored media files from the base unit may be uploaded to the portable media player.

19 Claims, 14 Drawing Sheets

(56) References Cited

U.S. PATENT DOCUMENTS

| | | |
|---|---|---|
| 2004/0227695 A1 | 11/2004 | Schedivy |
| 2005/0052981 A1* | 3/2005 | Shim et al. .................. 369/59.26 |
| 2005/0181756 A1* | 8/2005 | Lin .............................. 455/344 |
| 2005/0259532 A1* | 11/2005 | Roman et al. ................. 369/47.1 |
| 2006/0039263 A1* | 2/2006 | Trotabas ......................... 369/86 |
| 2006/0044969 A1* | 3/2006 | Kudo et al. ................. 369/47.12 |
| 2006/0075343 A1 | 4/2006 | Henry |
| 2006/0206582 A1* | 9/2006 | Finn .............................. 709/217 |
| 2008/0086379 A1* | 4/2008 | Dion et al. ....................... 705/14 |
| 2008/0273698 A1* | 11/2008 | Manders et al. .............. 380/200 |
| 2008/0285952 A1* | 11/2008 | Cohen et al. .................. 386/104 |
| 2008/0317246 A1* | 12/2008 | Manders et al. ................ 380/37 |
| 2009/0204640 A1* | 8/2009 | Christensen et al. ....... 707/104.1 |
| 2009/0327560 A1* | 12/2009 | Yalovsky ....................... 710/303 |

* cited by examiner

METHOD AND SYSTEM FOR DOWNLOADING AND MANAGING AN EDITED MEDIA STREAM TO A PORTABLE MEDIA DEVICE

CROSS REFERENCE TO RELATED APPLICATIONS

The present application claims priority from U.S. Provisional Patent Application Ser. No. 61/088,438, filed Aug. 13, 2008, which is incorporated herein by reference into the present disclosure.

FIELD

The present disclosure relates to media systems, and more particularly to a media system adapted to record and playback media content from an external source.

BACKGROUND

Various devices are known for downloading and or recording music and other media content to a portable device. Such devices generally download or record particularly selected content in the form of individual songs, albums or podcasts, for example.

To a more limited extent, it is known to record audio broadcasts to a device and edit any commercials or unwanted non-song content from the recorded content. For example, U.S. Pat. No. 7,062,442 discloses a method and a system for locating and recording time-limited signal sequences in media channels that may contain undesirable signal components (e.g., recording music in radio transmissions). The disclosure of this document is hereby incorporated by reference in full into the present disclosure. The signals are continuously buffered in a memory. The user identifies a desired source material. Out of this desired source material a section may be taken as a search key. The device may also select search keys automatically. If a second instance of the search key is detected, signal sequences that in time are connected to the search keys are compared. The signal sequences that by comparison are substantially identical are identified as belonging to the same, wanted, source material.

Previously developed media storage and playback systems have often been complicated to setup or to operate. This has made their operation challenging by users with limited experience with electronic devices.

Accordingly, it remains desirable in the pertinent art to provide an improved method and system for downloading and managing an edited media stream for future playback.

BRIEF DESCRIPTION OF THE DRAWINGS

The present disclosure will become more fully understood from the detailed description and the accompanying drawings, wherein.

SUMMARY

Figure 1:
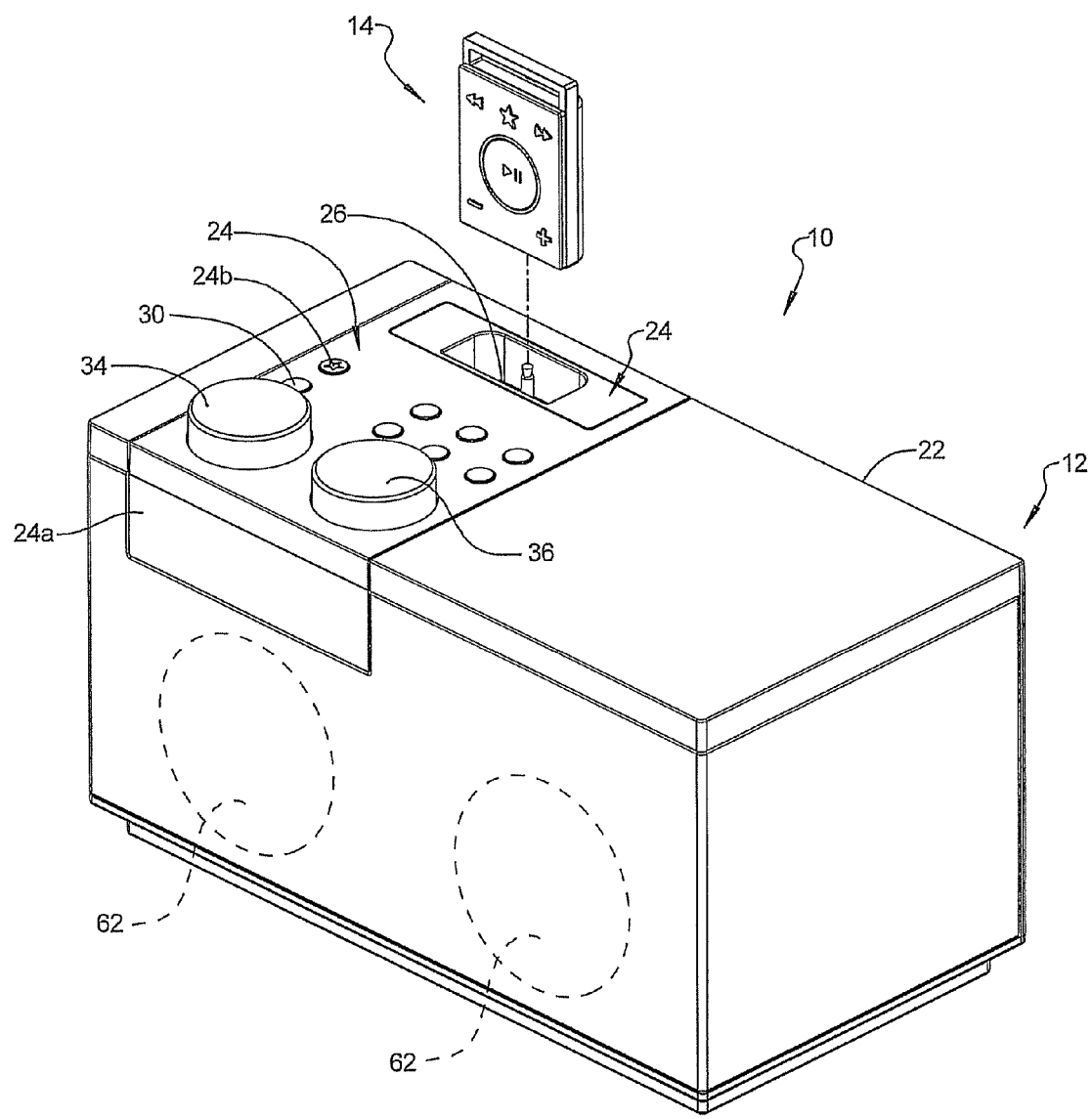
FIG. 1 is a perspective illustration of one embodiment of a media system that may be constructed in accordance with the present teachings of the present disclosure, and more particularly showing one embodiment of a base unit of the present with one embodiment of a portable audio player docked to the base unit.

In one aspect the present disclosure is directed to a media system. The media system may comprise a base unit adapted to playback and record media content being received from an external media source. The base unit may further be adapted to analyze the media content and to automatically extract therefrom, without intervention by a user of the system, intermittent, designated portions of the media content as the media content is received by the base unit, and to store the designated portions of the media content as media files for subsequent playback. The system may also include a portable media player adapted to be docked to the base unit. The portable media player may have uploaded thereto the stored media files from the base unit.

In another aspect the present disclosure is directed to a media system that may include a base unit and a portable media player. The base unit may be adapted to receive media content from a media content source. The base unit may include a controller, a memory, and a gap detection software module for detecting gaps in the media content being received by the base unit. The controller may use the gap detection software module to filter out portions of the media content and to store a remaining quantity of the media content as media files in the memory. The portable media player of the system may include a rechargeable battery and a memory. The portable media player may be adapted to be electrically coupled to the base unit so that the stored media files can be uploaded from the memory of the base unit to the memory of the portable media player for subsequent playback on the portable media player by a user.

In another aspect the present disclosure may be directed to an apparatus adapted to receive media content from a media content source. The apparatus may comprise a controller, a memory in communication with the controller, and a gap detection software module used by the controller for detecting gaps in the media content being received by the apparatus. The controller may use the gap detection software module to filter out portions of the media content and to store a remaining quantity of the media content as media files in the memory. The apparatus may also include a playback control for initiating playback of the media files as audio files. A control may also be provided for allowing a user to protect specific ones of the media files, as the media files are being played back as the audio files, against deletion from the memory.

In another aspect the present disclosure is directed to a portable media player adapted to receive media files from an external device. The portable media player may comprise a housing, a controller, and a memory in communication with the controller for storing media files thereon. A transducer may be adapted to receive the stored media files when the stored media files are being played back on the portable media player and to convert the stored media files to audio tracks. A control in communication with the controller may allow a user to protect specific ones of the stored media files against future deletion as the stored media files are played back as the audio tracks by the transducer.

In another aspect the present disclosure relates to a method for recording and playing back media content received from a media source. The method may comprise using a base unit to receive media content from an external media source, with the media content including first portions intermittently separated by second portions. The media content may be analyzed to detect the first portions. Only the first portions may be stored as separate media files in a memory of the base unit. A first control may be provided for allowing a user to play back the stored media files. A second control may be provided for allowing the user to designate specific ones of the media files stored in the memory of the base unit that cannot be deleted. A portable media player may be placed in communication with the base unit, and media files stored on the base unit may be uploaded to a memory of the portable media player for future playback on the portable media player.

DETAILED DESCRIPTION

The following description is merely exemplary in nature and is not intended to limit the present teachings, their application, or uses. Although the following description is related generally to a system for downloading recorded music, it will be understood that the system may be adapted to download other media content. Therefore, it will be understood that the following discussions are not intended to limit the scope of any appended claims.

With general reference to the drawings, a media system constructed in accordance with the present teachings is illustrated and generally identified at reference character 10. The media system 10 is illustrated to generally include a base unit 12 and a portable media player 14. As will become more apparent below, the base unit 12 is operative to receive media content from a media content source, for example an FM signal source or possibly another device that is interfaced to the base unit 12. These features of the base unit will be described in greater detail in the following paragraphs.

In one implementation the base unit 12 of the media system 10 may receive FM signals containing music. For the purpose of discussion, the music may be thought of as simply "streaming music" or "streaming media". The streaming music may include commercials or various advertisements interspersed between songs. The commercials or advertisements may be content that a listener does not consider desirable or enjoyable to listen to. The streaming music, if obtained from an FM signal originating from an FM radio station will typically also include dead air (e.g., breaks between songs). As briefly discussed above, the media content may also include video content or both audio and video content. The media content may also include text or other data.

The source for the media content may be selected from a group including, but not limited to: High Definition (HD) radio, Internet radio, digital audio broadcasting, AM radio, FM radio, or any other media source. However, it will be appreciated that the system 10 may just as readily be used with little or no modification to provide any other form of media content. As such, the term "content", when it is referred to herein, is understood to imply audio, video and any other type of content. For convenience, the following discussion will focus on the media as being FM audio content.

An external media source may supply media content to the base unit connected through an external input such as RCA or ¼" (3.5 mm) stereo cable and jack, a USB connector and its associated cable, etc., and digital input for external audio source. In this example the external media source may be, for example, a satellite radio receiver, an Internet radio source, or any audio content source. In certain applications, the base unit 12 of the media system 10 may be dedicated to a particular media source. In other applications, the base unit 12 may be switchable between multiple media sources or otherwise adapted to receive media content from various types of media sources.

Figure 2:
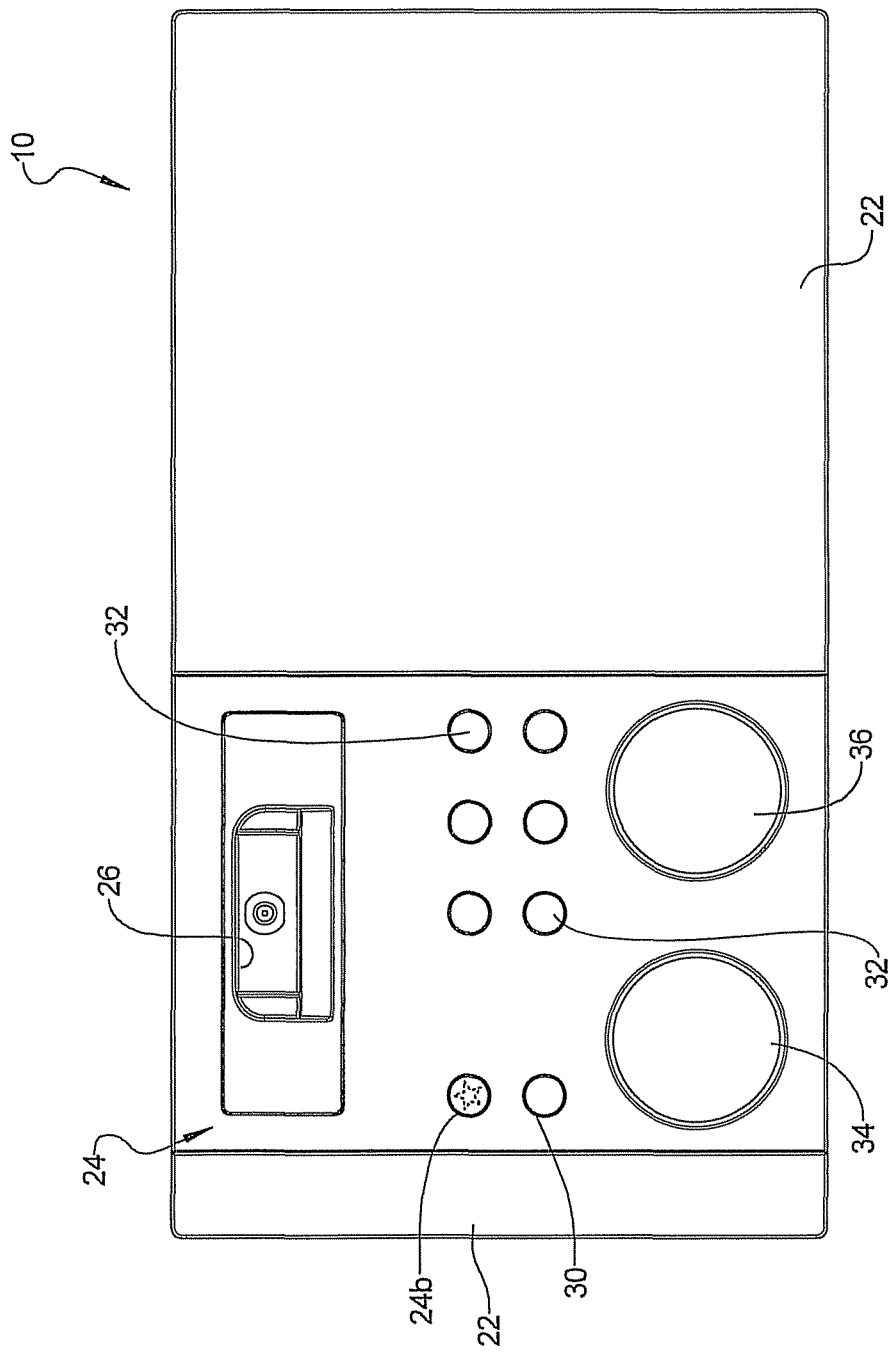
FIG. 2 is a top view of the media system of FIG. 1 without the portable audio player.

With particular reference to FIGS. 1 and 2 of the drawings, the base unit 12 of the present invention is shown to generally include a cabinet 20, one or more decorative caps 22, and control panel 24. The control panel 24 may define an opening or recess for a docking port 26 for receiving the portable media player 14. The opening may generally conform in size and shape to the cross-section of the portable media player 14 to allow the portable media player to be securely supported, both mechanically and electrically, on the base unit 12 when attached to the docking port 26. The interface between the base unit 12 and the portable media player 14 that is formed by the docking port 26 may be of any type well-known in the art, for example a well known 4-pin USB port. However, any suitable form of data port may be used. The control panel 24 may also include a display 24a, for example a liquid crystal display (LCD), for displaying various types of information, for example, an FM channel that the base unit 12 is present tuned to, the present time, a volume level; a song title for a song being played, etc.

The control panel 24 may also include a mode button 30, and a plurality of preset FM station buttons 32. The mode button 30 may be used to select between FM mode, playback mode where recorded music is played back, and displaying the time. In one embodiment the system 10 may employ well known "jack sense" technology to sense if an auxiliary input device or cable is coupled to an auxiliary input of the system 10, and to automatically use the signal provided on the auxiliary input when the mode button 30 has selected FM as the input.

A power button 28 may be located in any convenient location, but in one embodiment is located on a rear area of the 20. The control panel 24 may further include a volume control 34 and a tuning control 36, which are shown as enlarged knobs. The Tuning control 36 may also be of the type that has a pushbutton feature that enables it to control an additional operation besides tuning. In one embodiment the tuning control 36 makes use of such a pushbutton to implement a PLAY/

PAUSE feature when one wants to listen to media content that has been saved on the base unit 12. When the tuning control 36 is pushed to start playback of a recorded media file, then rotating the knob 36 clockwise forwards to the next stored media file for playback. Rotating the tuning control 36 counterclockwise skips back to select the previously stored track. The knob 36 may employ detents that provide a series of tactile "clicks" or detents as it is rotated, where each click will move forward or backward by one media file. Thus, rotating the knob 36 in one direction, for example clockwise, for 5 clicks would advance 5 media files forward while rotating the knob 36 counterclockwise 3 clicks would backtrack 3 media files. Alternatively the volume 34 and tuning 36 controls may take other forms such as conventional touch sensitive membrane switches that when touched or held down enable the user to select a different FM station or to select a volume level setting, etc., although additional, separate controls may need to be implemented to control playback if such membrane switches are used.

The control panel 24 may also include a Lock/Unlock button or control 24b. The Lock/Unlock button 24b may be used to "tag" a particular song that is playing on the base unit 12 as a song that is to be "protected" after being uploaded from the base unit 12 to the portable media player 14. This feature will be discussed in greater detail in the following paragraphs. The Lock/Unlock button 24b may also be used to delete a media file (e.g., a song file) currently stored in the base unit 12. These features will also be described in greater detail in the following paragraphs, and particularly the flowcharts of FIGS. 15 and 16. Any one or more of the buttons included on the control panel 24 may include raised tactile features to enable persons with visual impairments to easily detect, simply by tactile feel, the various buttons.

Figure 3:
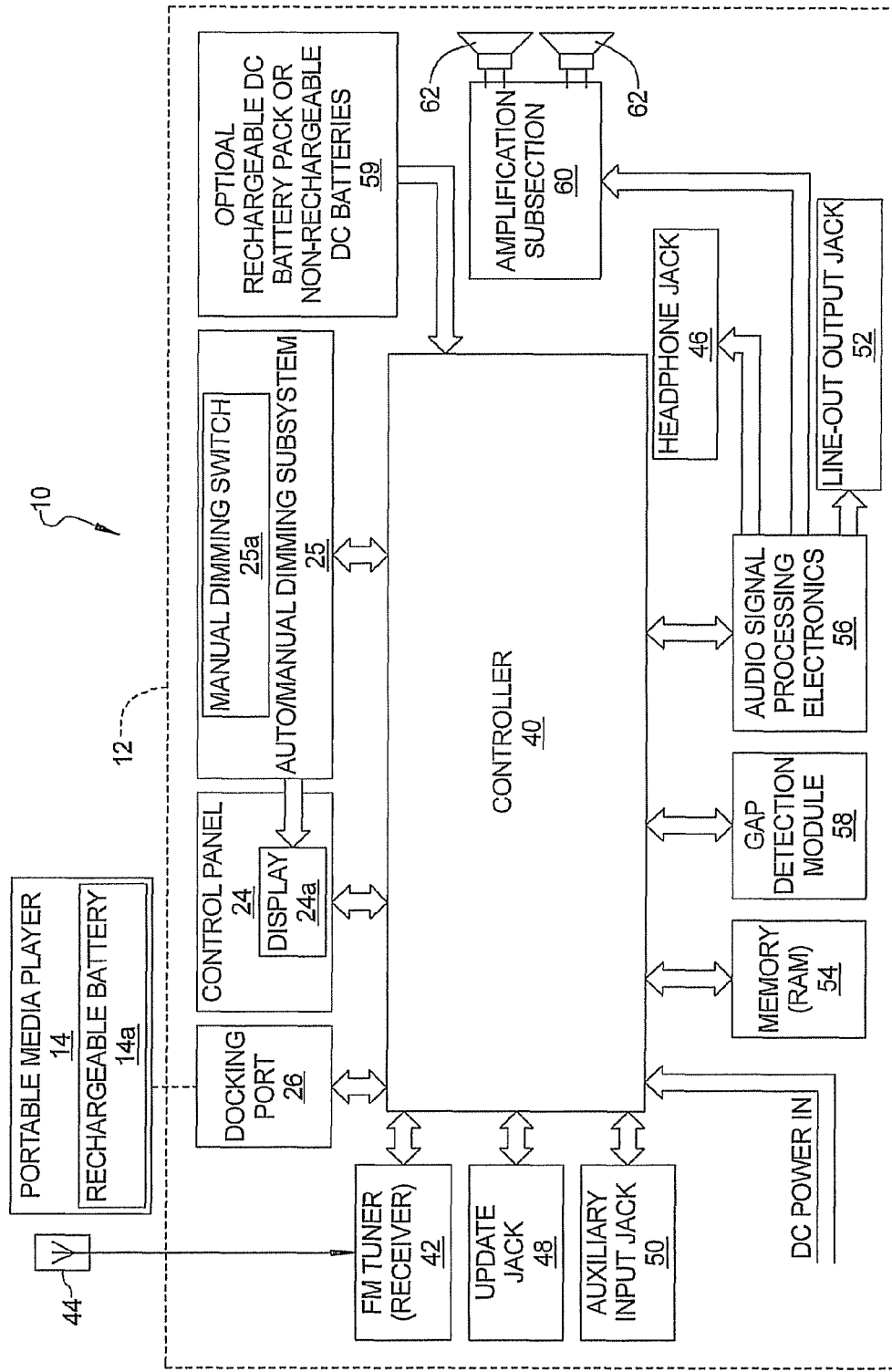
FIG. 3 is a high level block diagram of various components that may be used to form the base unit.
Figure 4:
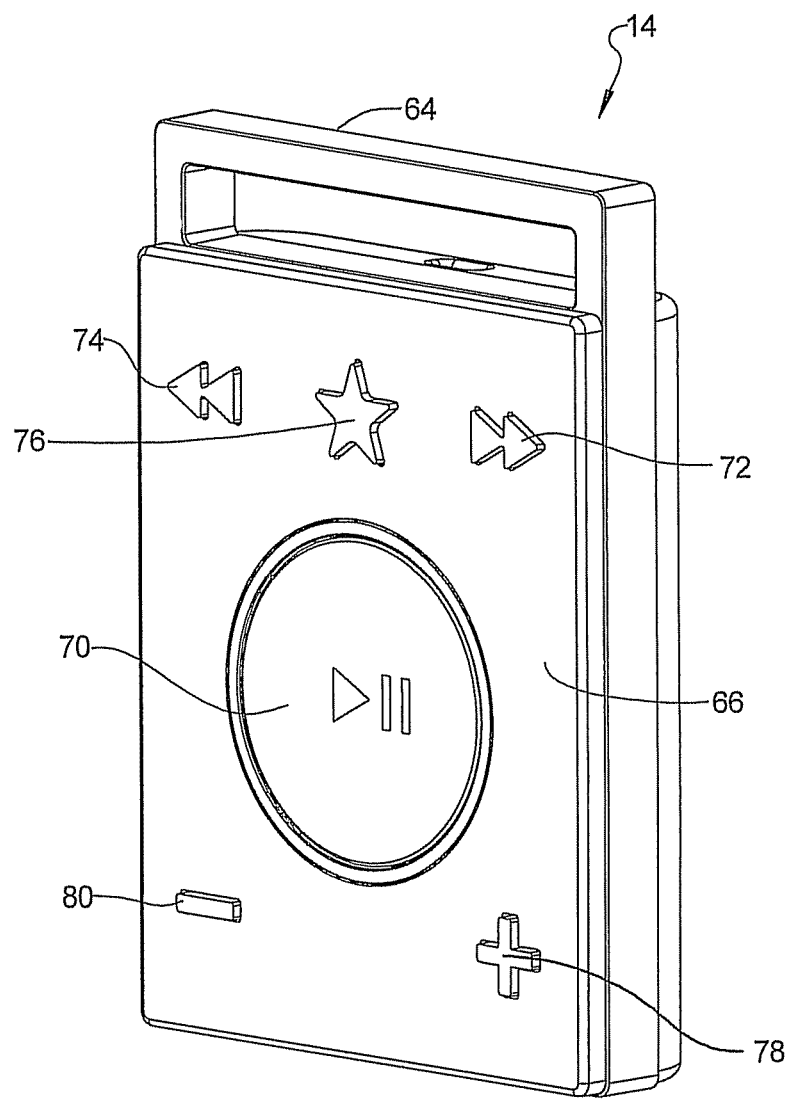
FIG. 4 is a front perspective view of the portable audio player of FIG. 1.
Figure 5:
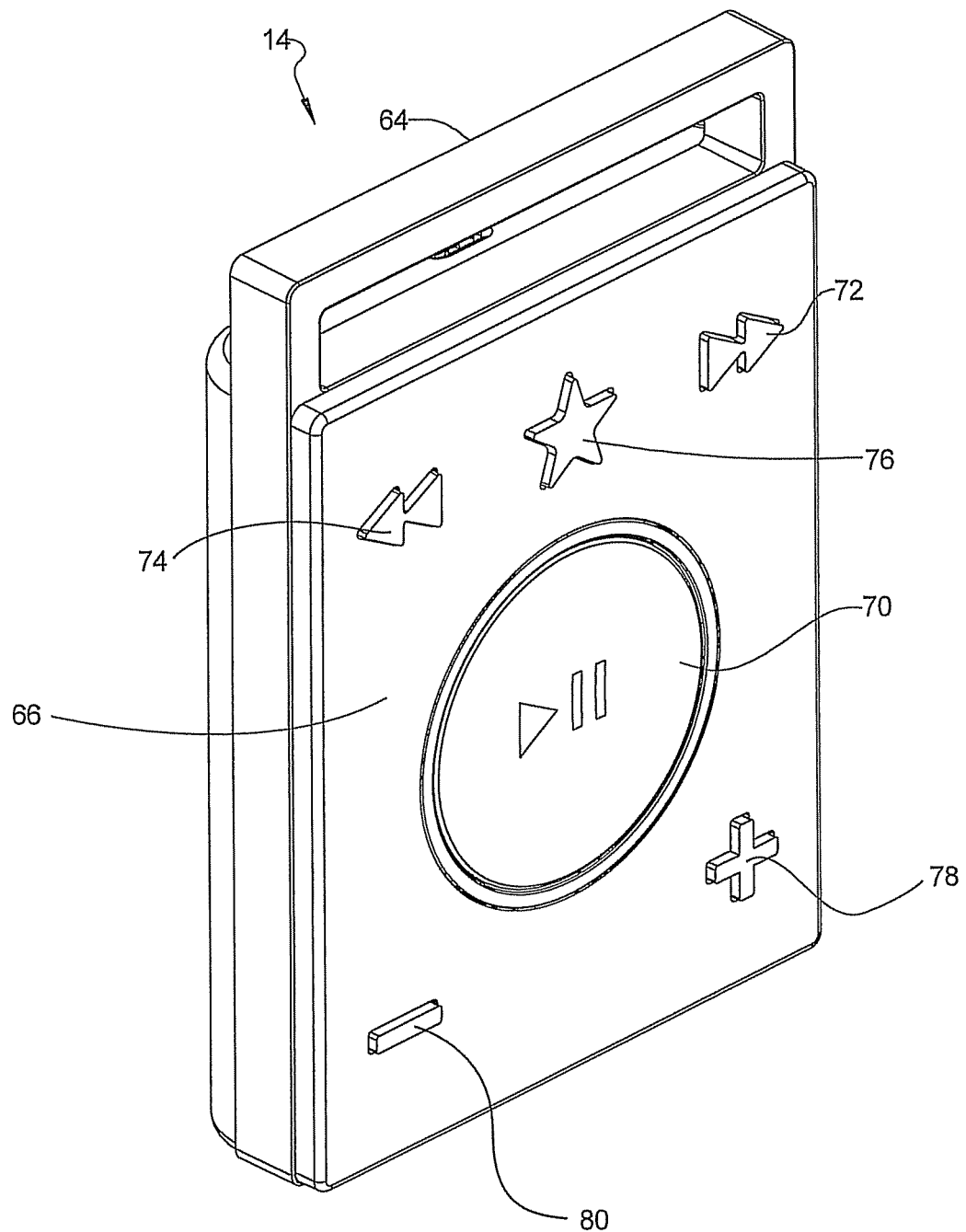
FIG. 5 is another front perspective view of the portable audio player of FIG. 1.
Figure 6:
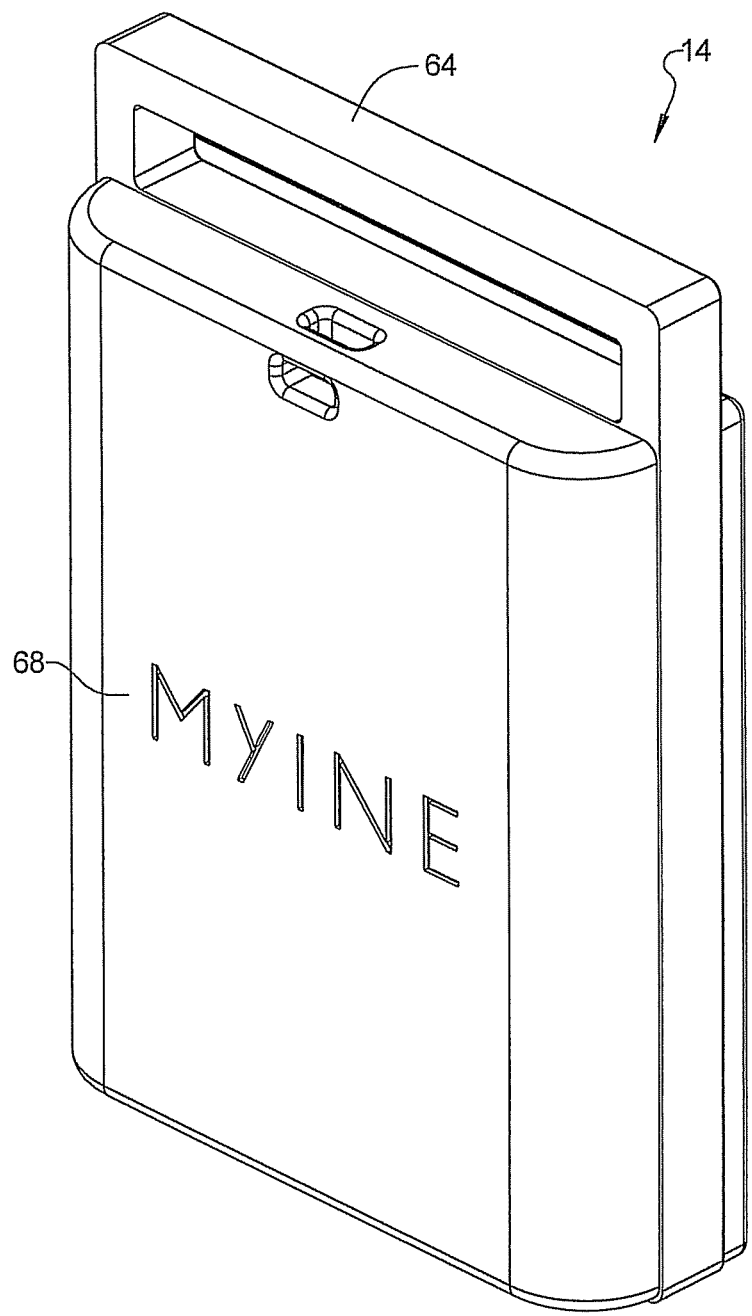
FIG. 6 is a rear perspective view of the portable audio player of FIG. 1.
Figure 7:
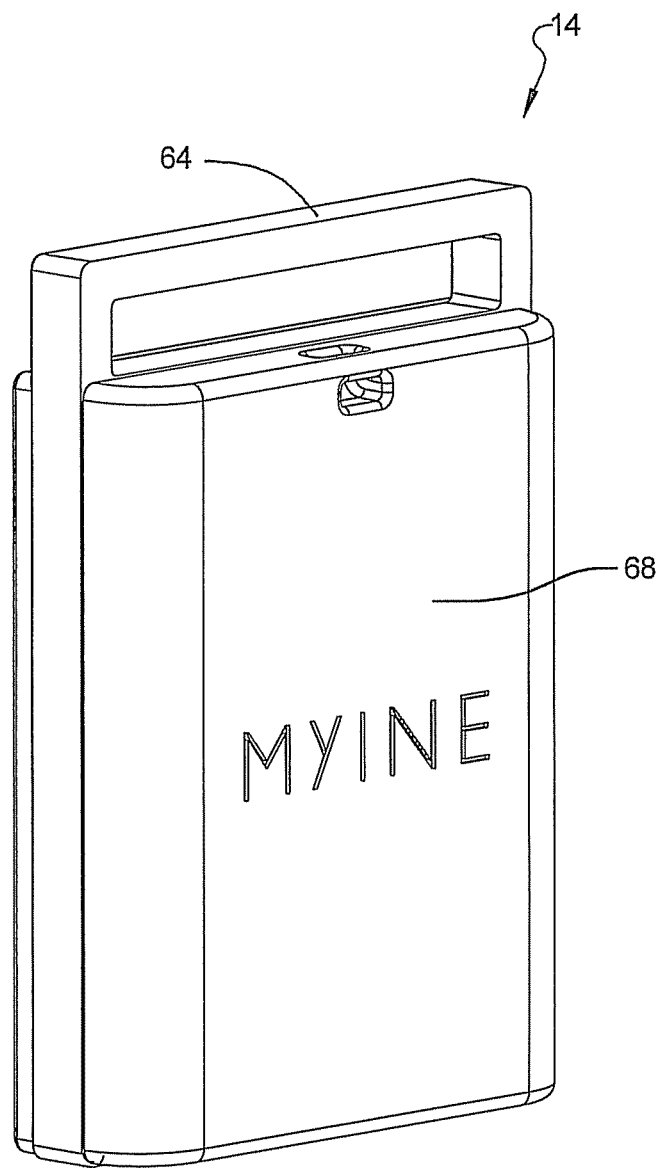
FIG. 7 is another rear perspective view of the portable audio player of FIG. 1.
Figure 8:
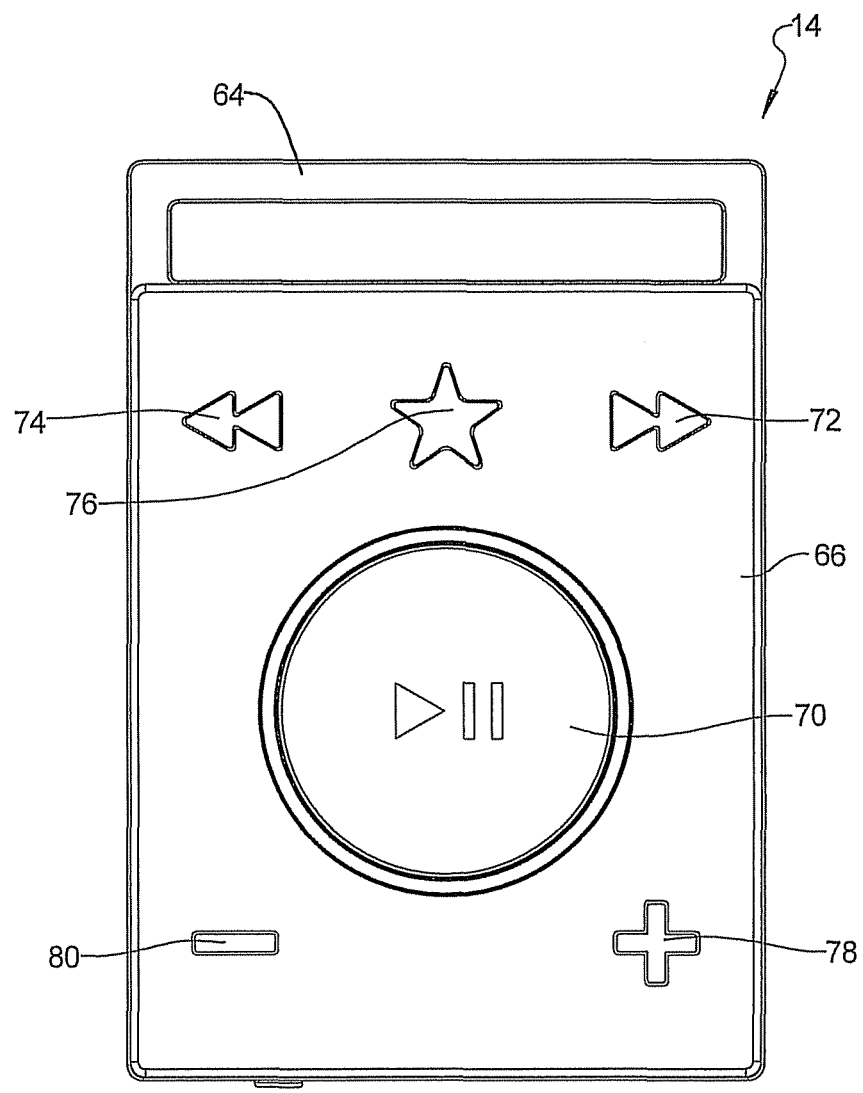
FIG. 8 is a front view of the portable audio player of FIG. 1.
Figure 9:
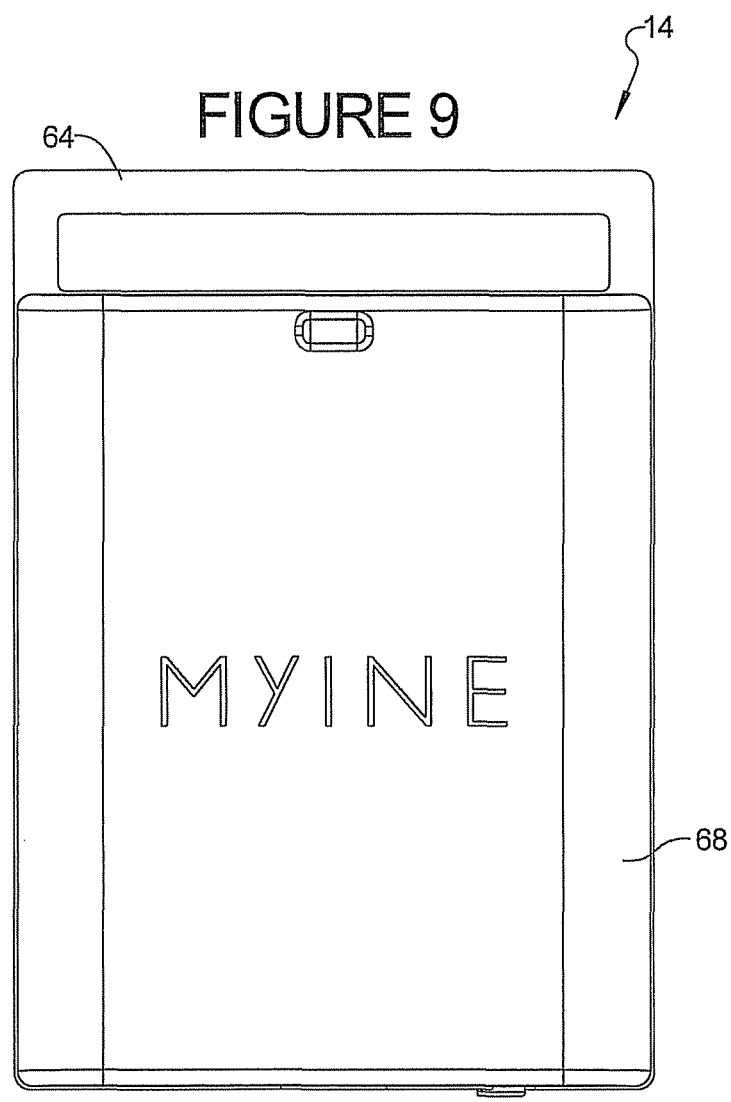
FIG. 9 a rear view of the portable audio player of FIG. 1.
Figure 11:
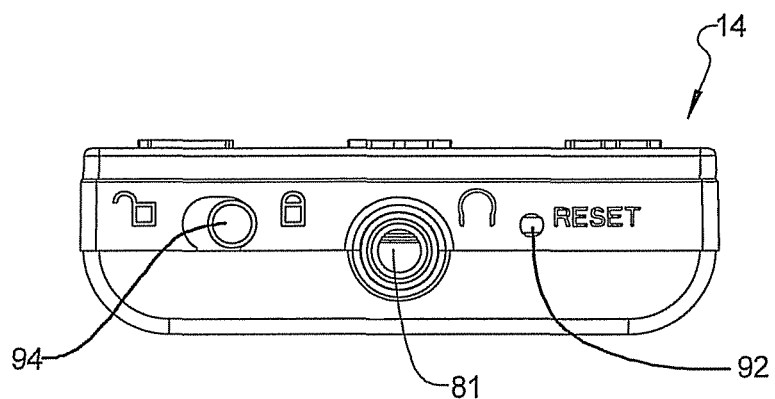
FIG. 11 is a bottom view of the portable audio player of FIG. 1.
Figures 12, 13:
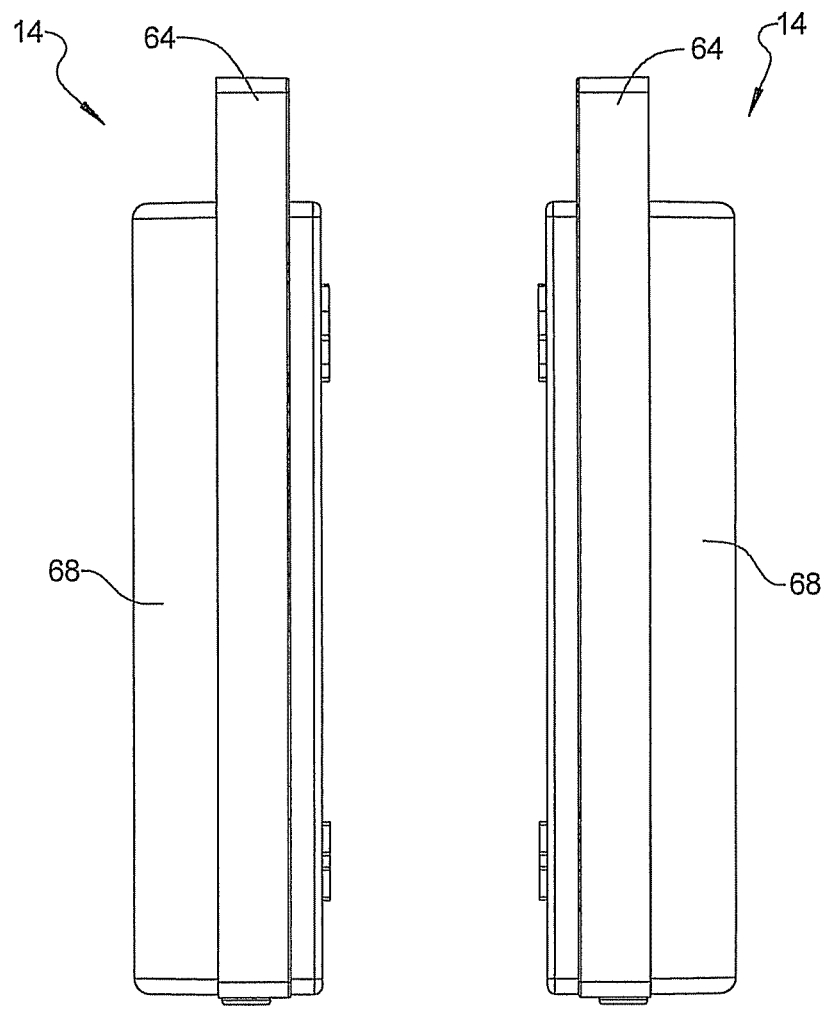
FIG. 12 is a left side view of the portable audio player of FIG. 1.
FIG. 13 is a right side view of the portable audio player of FIG. 1.
Figure 10:
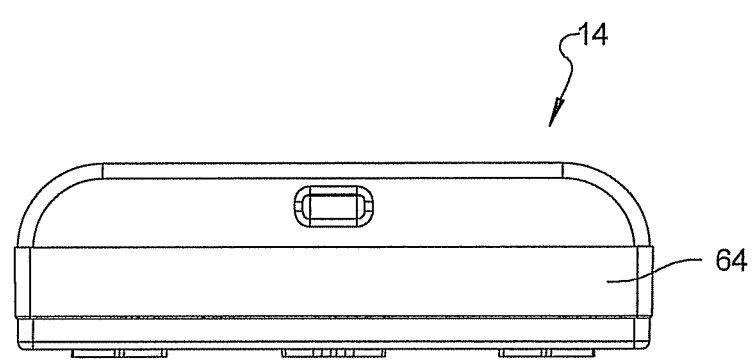
FIG. 10 is a top view of the portable audio player of FIG. 1.

Referring now to FIG. 3, a block diagram representation of various subsystems and elements of one embodiment of the base unit 12 is shown. The base unit 12 in this example receives DC power from a conventional transformer (not shown), although it will be appreciated that AC power could be used to directly power the base unit 12, assuming suitable rectification circuitry is employed with the base unit. The base unit 12 may include a controller 40 that is in communication with an FM tuner (i.e., receiver) 42. The FM tuner 42 may itself be in communication with an antenna 44 for receiving wireless FM signals and outputting same to the FM tuner 42.

The controller 40 may also be in bidirectional communication with a number of other inputs and outputs of the base unit 12. For example, the controller 40 may be in bidirectional communication with the docking port 26; with the control panel 24; with an update jack 48; and with an auxiliary input jack 50. The update jack 48 may be provided for future use, for example to update firmware used in the base unit 12. The Line-Out jack 52 could be used to enable the audio output from the base unit 12 to be input to a home stereo or any other external device for playing back audio content stored on the base unit 12. The auxiliary input jack 50 may be used to receive audio content from an external audio source, for example a satellite radio receiver, or a computer receiving streaming audio via an Internet radio connection, or any other external audio source.

The controller 40 may also be in bidirectional communication with a memory (e.g., RAM) 54, an audio signal processing subsystem 56, a gap detection module (hardware and software) 58, and the line-out output (RCA) jack 52. An optional rechargeable DC battery pack or non-rechargeable DC batteries 59 may be included to power the various electrical components of the base unit 12. The memory 54 may be used for the temporary storage of digital information representing media files. The signal processing subsection 56 may include various conventional signal processing subsystems such as a conventional preamplifier circuit, one or more digital to analog (D/A) circuits, one or more analog to digital (A/D) circuits, one or more comparator circuits, and other conventional signal processing components and circuitry. The signal processing subsystem 56 may be in communication with a headphone jack 46 and also with a Line-Out output jack 52. The controller 40 may be a microprocessor or any other suitable form of microcontroller. The signal processing electronics 56 may provide an electrical output signal representing a stored media file to the amplification module 60 that is amplified and then converted into audio form by one or more speakers 62. An automatic dimming subsystem 25 with a manual user control 25a may be in communication with the controller 40 and with the display 24a for enabling a user to manually dim the display 24a. Alternatively, the dimming subsystem 25 will automatically dim the display using, for example, a suitable photo sensor, unless the user has manually dimmed the display 24a.

The gap detection software module 58 may include software such as that disclosed in U.S. Pat. No. 7,062,442 that senses "gaps" in audio content being received by the FM tuner 42 or possibly audio content being received at the auxiliary input jack 50 from a different audio source (e.g., Internet radio). For convenience, the following discussion will assume that the audio content being received is broadcast FM signals that are received by the FM tuner 42. The broadcast FM signals represent music (i.e., songs or "media files" or "first portions") of the media content being broadcast, together with commercials and advertisements interspersed between the songs that may be considered "second portions" of the media content being broadcast. In one implementation the gap detection software module effectively "filters out" the advertisements, DJ talk, etc. separating songs that are being received from an FM or AM broadcast source and creates media files for just the songs, with each song representing a separate media file. These media files will be referred to throughout the following discussion simply as "song files". The song files may be MP3 files or may be in other any suitable format, for example FLAC (Free Lossless Audio Codec). If the files are video files then any suitable video format may be employed.

Turning now to FIGS. 4 through 14, the portable media player 14 will be further described. The portable media player 14 is illustrated to generally include a back housing 64 and a front cover 66. The portable media player 14 may further include a back (metal or high strength plastic) cover 68. The back cover 68 may be secured to the back housing 64 in any conventional manner. The housing 64 or other portion of the portable media player 14 may optionally have a suitable hole or structure to which a lanyard (not shown) may be attached so that a user may carry the player 14 when the lanyard is worn around the neck.

The portable media player 14 may further include a plurality of control buttons (or alternatively membrane switches) that extend through openings in the front cover 66 and cooperate with a PCB (not shown) disposed inside the portable media player 14. The plurality of buttons or controls may include a centrally located Play/Pause button 70, Forward and Reverse track selection buttons or controls 72 and 74, and a Lock/Unlock button or control 76. The plurality of controls may further include an independent volume up button 78 and an independent volume down button 80. The buttons 70-80 may take any form, but in one form may comprise conventional membrane switches. Any one or more of the buttons 70-80 could include raised, tactile features that enable persons having a visual handicap to readily discern, by tactile feel, the various buttons. If conventional membrane switches are employed, such switches will allow a momentary pressing action to provide a selection control, while holding down a membrane switch continuously allows repeated selections to be performed, such as for increasing or decreasing volume or for rapidly forwarding or reversing track selections for recorded song files. An audio transducer 81 forming a headphone assembly may be worn in or adjacent to the ears of a user, and may be electrically coupled to the back housing 64 at the headphone jack 88. A hold switch 94 may be employed to "lock out" the other controls on the portable media player 14.

The portable media player 14 may interface with the base unit 12 for controlling the storage of song files on the portable media player 14. The interface between the portable media player 14 and the base unit 12 may operate to constantly fill the internal memory of the portable media player 14 to capacity or near capacity and replace older media files (e.g., song files) with new media files from the base unit 12. This may also be considered a first-in, first-out method (FIFO) of updating the memory content of the portable media player 14.

Users have the option to lock (i.e., save or write/delete protect) a song file on the portable media player 14 via the Lock/Unlock button 76. Similarly, a song file may be designated as being write-protected through button 24b on the base unit 12, and will be treated as a write-protected file after it is uploaded to from the base unit 12 to the portable media player 14. In this example the base unit 12 will only replace older media files (e.g., stored song files) with newer recorded song files in accordance with the FIFO protocol, although it will be appreciated that different protocols could be employed for determining which recorded song files are to be deleted first. Files that are stored on the base unit 12 and which are designated (i.e., "tagged") as being write-protected will still be overwritten on the base unit 12, if memory space on the base unit becomes too limited. However, these files will be treated as write-protected files by the portable media player 14 after they are uploaded to the portable media player 14. It will be appreciated that this methodology could easily be altered so that song files stored on the base unit 12 can be designated and treated as write-protected files by the base unit 12 so that same cannot be deleted by the base unit 12.

When the lock/unlock button 76 on the portable media player 14 is pressed, or a "Lock/Unlock" control (not particularly shown) is pressed on the control panel 24 of the base unit 12 while a given song is playing, the media file being currently played will be "locked" (i.e., write-protected against automatic deletion). In one embodiment of the base unit 12, regardless if a song file is locked or not locked, the base unit 12 automatically deletes the song file if available space in the memory 54 becomes unavailable. Locking of a song file may be performed while the song is being recorded on the base unit 12, while a song is being played back on the base unit 12, and while a song file is displayed on the display 24a, or independently from digital media delivered into the base unit 12.

When a lock command is given via the Lock/Unlock button 24b of the control panel 24 (as described above) for a song file that is currently locked, the controller 40 will "unlock" the song file unless it is a permanently locked file delivered from a digital media source. Some media files that are digitally delivered to the base unit 12 may be able to be unlocked as per copyright laws. Some media files delivered to the base unit 12 must remain permanently locked.

The base unit 12 may operate to remove commercials or other undesirable content from a stream of media. One manner of removing commercials or undesirable content interspersed from between portions of music content (i.e., songs) in the streaming media content is described in U.S. Pat. No. 7,062,442. There are additional other available techniques that may be able to remove (i.e., capture) songs delivered from digital file breaks, as well as well known analog methods of looking for "dead air" (no audible signal) to signify audio breaks. For example, CDs typically have a two second dead air space between each individual song track. The base unit 12 may remove the dead air and use this dead air as a marker to separate songs.

The portable media player 14 may comply with the Serial Copyright Management System (SCMS) portion of the Audio Home Recording Act. There are a variety of devices available that comply with the SCMS through digital rights management (DRM). The portable media player 14 and the base unit 12 comply as they do not allow a copy of the recording to be made on additional devices. A principal advantage of the system 10 is that it provides a computerless system for SCMS without using a traditional DRM approach. The user does not need to provide any input to the system 10 in order for song files to begin being uploaded from the base unit 12 to the portable media player 14 when the player is docked on the base unit.

Figure 14:
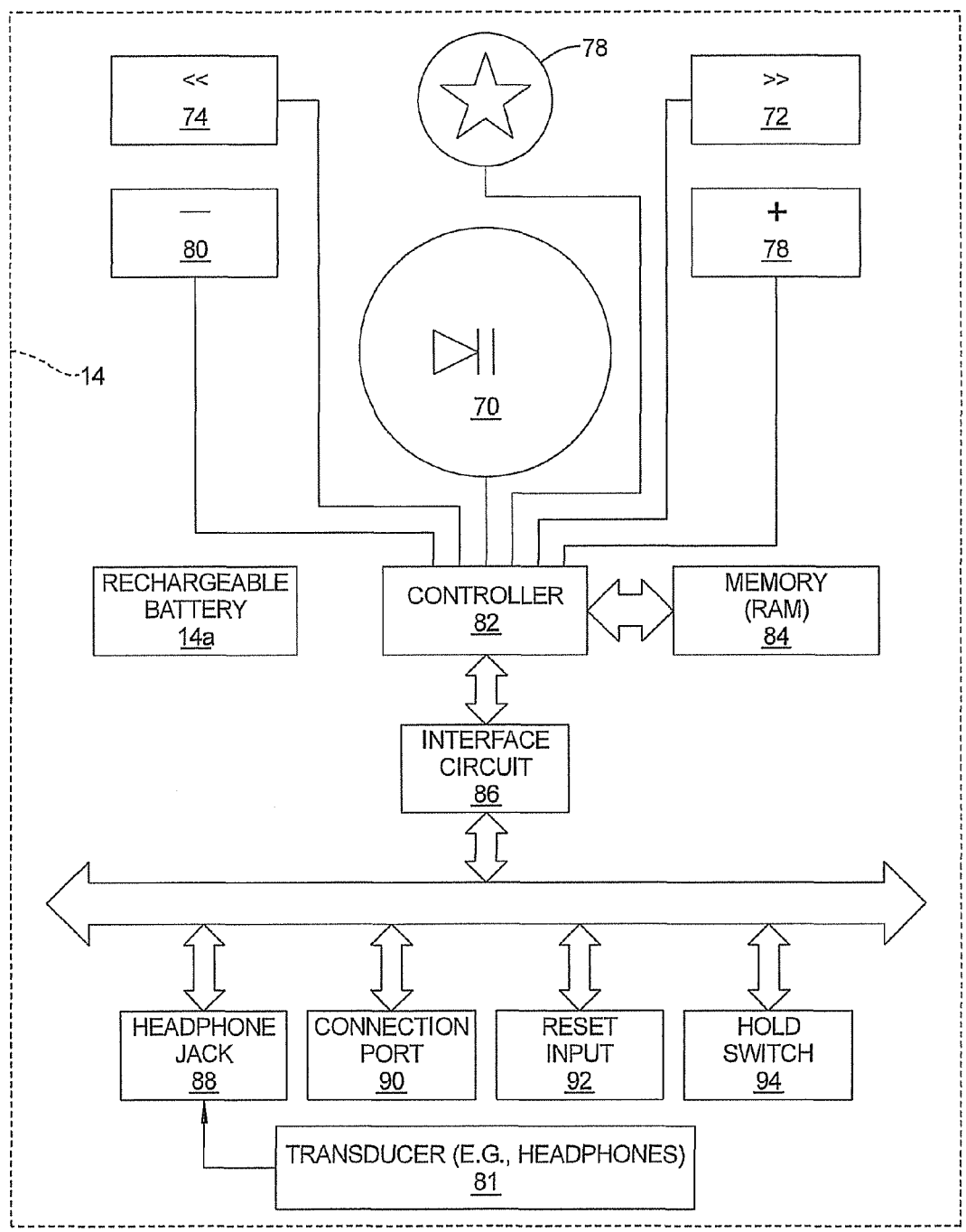
FIG. 14 is a high level block diagram of various components that may be used to form the portable media player shown in F*igure* 1.

With brief reference to FIG. 14, a high level block diagram of one embodiment of the portable media player 14 is shown. The portable media player 14 may use a USB interface. Alternatively, the portable media player 14 may use the FIREWIRE® interface protocol. The portable media player 14 may also make use of the BLUETOOTH® wireless connectivity standard to wirelessly connect with other BLUETOOTH® enabled devices. The portable media player 14 may use uPnp (DLNA) protocol or Wi-Fi protocol. The portable media player 14 may also connect over a mobile telephone system.

The portable media player 14 may include one or more internal PCBs having mounted thereon a plurality of components. The components may include a controller 82 that is in communication with a memory 84 (e.g., a RAM). The controller 82 may also be in communication with an interface circuit or subsystem 86, which as mentioned above may be a USB or FIREWIRE® type interface. The controller 82 may also be in communication with a headphone jack 88, an interface connection port 90 (e.g., USB, FIREWIRE® interface, etc.), a reset input switch 92 and a hold switch 94. The reset switch 92 may be recess mounted in the back housing 64 so that it cannot be accidentally depressed while handling the media player 14. The controller 86 may be adapted to detect when a plug of the audio transducer assembly 81 is inserted into the headphone jack 88, and may automatically power on the portable media player 14 when the insertion of a headphone plug is detected. The controller 82 may also be programmed so that the most recent (or the oldest) stored song file on the portable media player 14 automatically begins playing when the player 14 is powered up. A hard reset signal may be provided to the controller 82 by inserting an end of a small pointed implement, for example a paper clip, into the recess mounted reset input 92 switch and depressing it momentarily. The hold switch 94 may be used to lock in the current mode of the portable media player 14, for example so that if the player 14 is currently in a playback mode, then exiting that mode cannot be done by accidentally engaging one of the other controls on the player 14. The hard reset essentially functions similar to a hard reset on a desktop or laptop computer to power down and immediately power back up the system 10. The rechargeable battery 14a may comprise any suitable battery, for example a lithium ion battery. For convenience, the connections from the rechargeable battery 14a to the other electrically powered components of the portable media player 14 have not been shown so as to avoid cluttering the drawing figure. Alternatively, the portable media player 14 could be adapted with only minor modifications to use non-rechargeable batteries such as AA or AAA batteries.

It will also be appreciated that the base unit 12 could be configured with minor modifications to interface with one or more presently available portable media players, for example the Apple, Inc. IPOD® or IPHONE®. This would enable stored media files on the base unit 12 to be uploaded to either of these Apple, Inc. devices, or possibly to any other portable media player. In addition to interfacing with the hardware of another portable device, the base unit 12 may also communicate with the operating system on the device or through a suitable application, for example Google ANDROID™, IPHONE® OS, etc.

Figure 15:
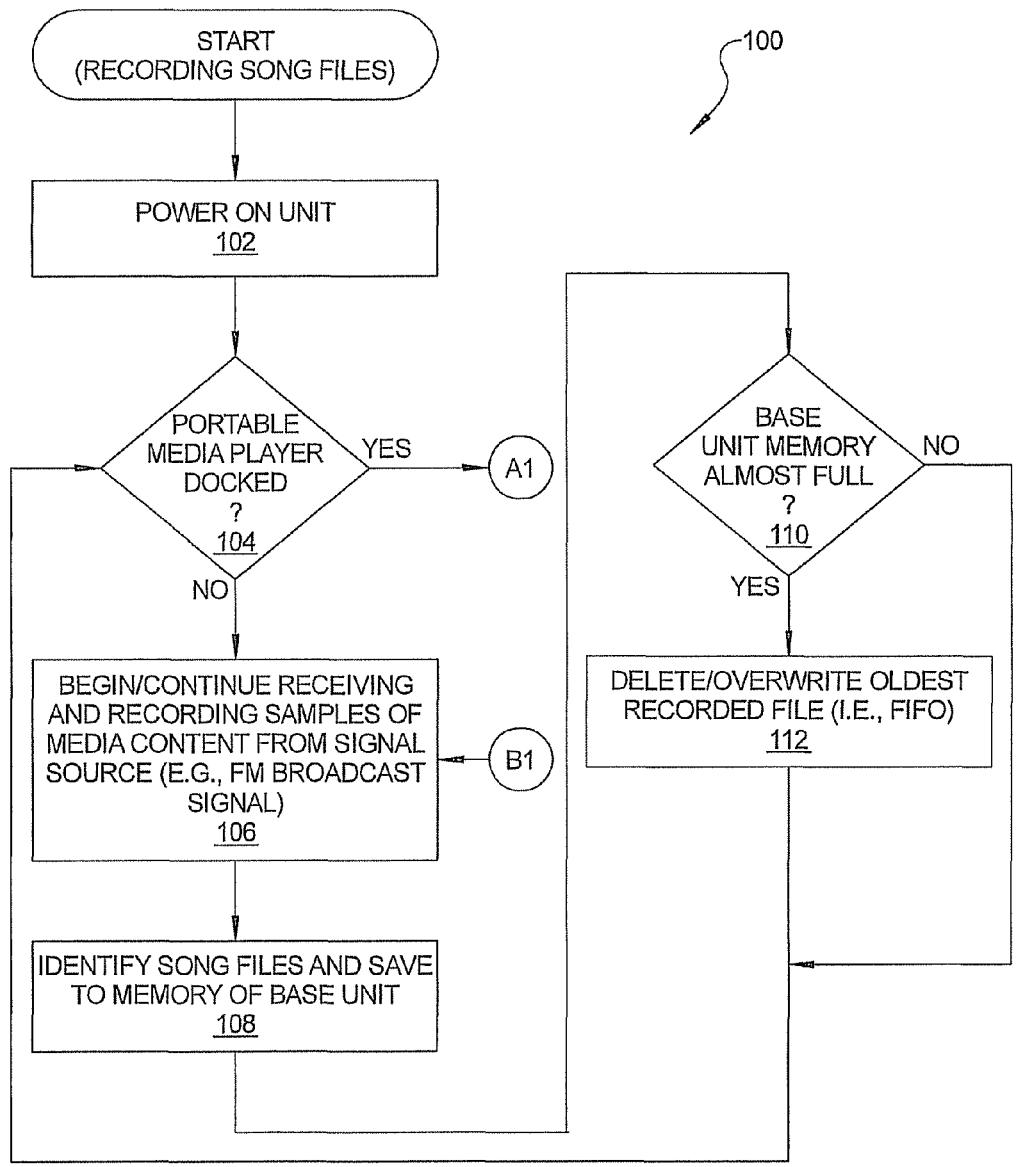
FIG. 15 is a flowchart of major operations that may be performed by the system 10 in recording media content with the base unit and uploading the recorded media content to the portable media player.

Referring now to FIG. 15 a flowchart 100 is shown illustrating various operations that may be performed by the system 10 during its initial operation. By "initial operation", it is meant the first time that the system 10 is used by a user. For this portion of the description it will be assumed that the portable media player 14 is not docked on the base unit 12.

At operation 102 the base unit 12 may be powered on by a user via its power button 28. At operation 104 a check is made if the portable media player 14 is docked on the base unit 12. If so, then a jump is made to the operational sequence shown in FIG. 17. If not, then at operation 106 the base unit 12 begins receiving media content from a media source and recording samples of the media content from the signal source. This is done by using the gap detection module 58 (FIG. 3). For this example it will be assumed that the media is an FM signal. The gap detection module 58 effectively "learns" a profile of music from a given station that is being recorded. By "learns" it is meant that the gap detection software module becomes familiar with the nature of the music being analyzed as well as the characteristics of the station broadcasting the music. A new learning period may be required if a different style of music is being played from one that was previously "learned" by the system. At operation 108 the base unit 12 identifies song files as monitoring of the FM content received continues, and saves each identified song as a new song to the memory 54 of the base unit. It will be appreciated that operation 108 also checks to see if a song file has been previously recorded, and if so, then it will not be re-saved a second time.

As mentioned above, for this example the FM media content will be songs with advertisements and disc jockey comments or news updates interspersed between the songs. The song files that are saved in the memory 54 contain may date and time information as to the day, and time of day, that the song files are recorded (i.e., saved) by the base unit 12. Alternatively, more recently stored song files may be distinguished from older song files simply by the order that they have been recorded in the memory 54.

At operation 110 a check is made if the base unit 12 memory 54 is almost full. By "almost" full it is meant that only a predetermined, or less, amount of free storage space is available in the memory 54. Such a predetermined amount may be, for example, 1 MB of storage space. If the inquiry at operation 114 produces a "No" answer, then operations 104-110 are repeated, and recording will continue. If the check at operation 114 indicates that the memory 54 is almost full, then the controller 40 may delete or overwrite one of the stored song files in the memory to make room for the newly recorded song file, as indicated at operation 112. In one example the oldest stored song file in the memory 54 may be deleted to make room for the next newly recorded song file. This arrangement follows a conventional "first-in-first-out" (FIFO) protocol. The creation and recording of song files may continue in sequential fashion as long as the base unit 12 is powered on and receiving an FM broadcast signal, with each newly recorded song files over-writing the oldest recorded song file when the memory 54 is otherwise almost full.

Figure 16:
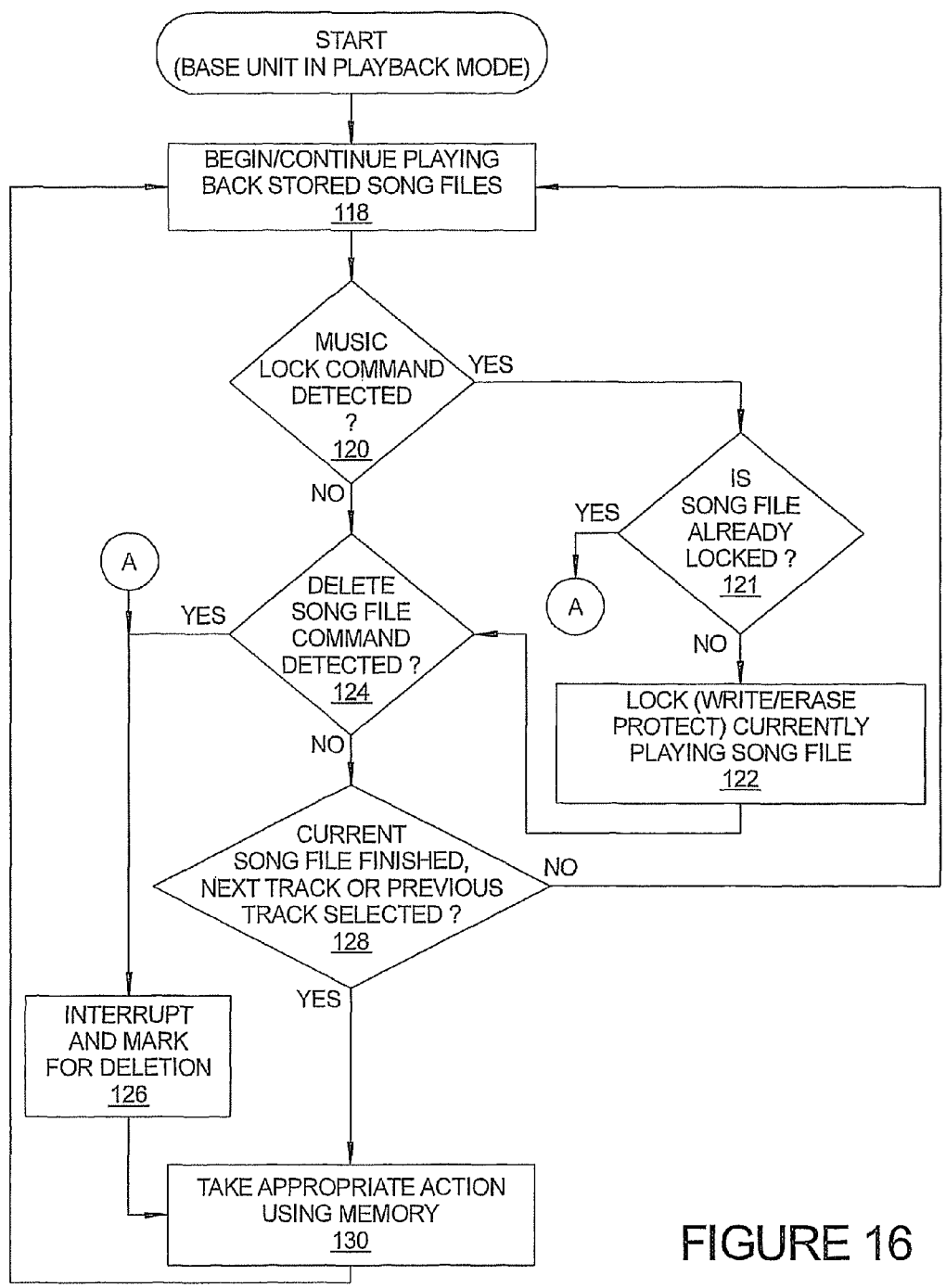
FIG. 16 is a flowchart of operations that may be performed by the system in uploading stored media files from the base unit to the portable media player when docking of the portable media player on the base unit is detected.

FIG. 16 illustrates operation of the base unit 12 in the playback mode. At operation 118 the base unit 12 begins playing back stored song files when the Play/Pause button 24c is selected by the user. At operation 120 the controller 40 checks if the music "Lock" command has been received via the Lock/Unlock button 24b on the base unit 12. If the Lock/Unlock button 24b is detected as having been depressed by the user, then the controller 40 checks to see if the song file is already locked, as indicated at operation 121. If so, the file is marked as a file that is to be deleted, and a jump to operation 126 is performed. If the answer to the inquiry at operation 121 indicates the file is not already locked, then the currently playing (and being recorded) song is stored with a suitable code that indicates that it is to be "locked" when uploaded to the portable media player 14 during the next performed synchronization routine. This code will transfer with the song file when it is later uploaded to the portable media player 14 in accordance with the FIFO uploading methodology.

At operation 124 the controller 40 checks to see if a delete command has been received using the Lock/Unlock button 24b. The delete command may be generated by continuously holding down the Lock/Unlock button 24b for a predetermined time, for example at least one second. If the delete command is detected the controller may interrupt the recording of the currently playing song file and mark it for deletion as indicated at operation 126.

At operation 128 a check is then made to determine if the current song has finished playing, or if the next track or previous track has been selected. If not, then a loop is made back to operation 118. If the current song file has finished playing, or if the next track or previous track has been selected, then the appropriate action (i.e., next song file, previous song track or next song track) is carried out using the memory 54 and operation 118 is repeated.

Figure 17:
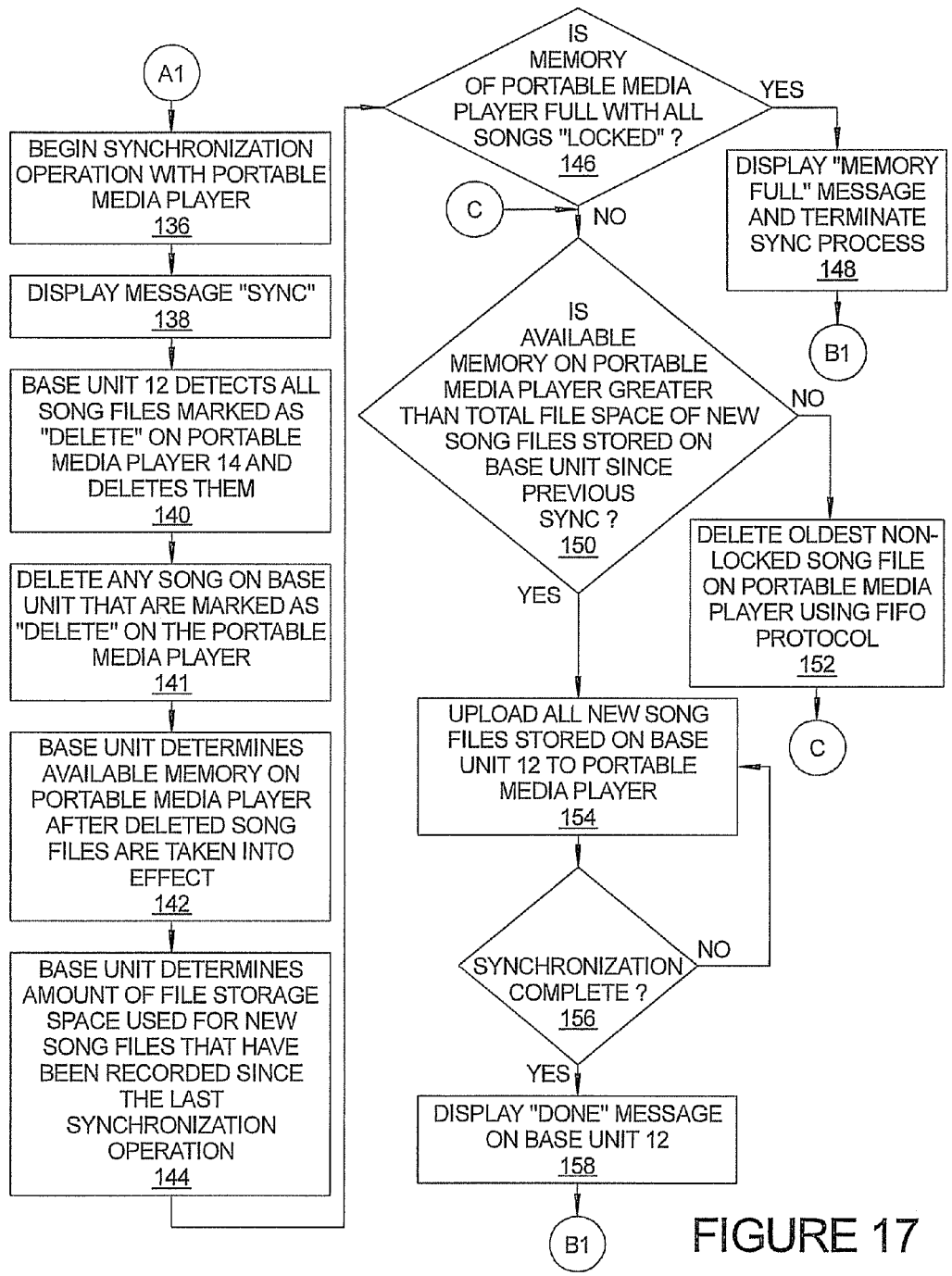
FIG. 17 is a flowchart of a synchronization process that may be performed by the system 10 each time the portable media player is placed in the docking port of the base unit to update the stored media content on the portable media player.

Referring to FIG. 17, the synchronization process mentioned above will be described. The synchronization process is used to update the portable media player 14 with any new song files stored on the base unit 12 that have not already been uploaded into the portable media player 14 whenever the portable media player 14 is positioned on the docking port 26 of the base unit 12. The check made at operation 110 in FIG. 15 is used to detect if/when the portable media player 14 is inserted into the docking port 26 of the base unit 12. For the following description it will be assumed that the base unit 12 has been used for a while and therefore includes a plurality of song files stored in its memory 54.

When docking of the portable media player 14 is detected by the controller 40 of the base unit 12, the controller 40 and the controller 82 of the portable media player begin communicating as indicated at operation 136. At operation 138 the base unit 12 may display a message on its display 24a such as "SYNC", or something to this effect to let the user know that the system 10 is about to start updating the memory 84 of the portable media player 14 with new song files. At operation 140 the base unit 12 detects any song files that have been marked as "DELETE" by the user on the portable media player 14 and marks corresponding song files stored on the base unit 12 with a "DELETE" code. At operation 141, any song file that is presently marked "Delete" on the portable media player 141, but which is still present on the base unit 12, is also deleted from the base unit 12 memory 54. At operation 142 the base unit 12 determines the available memory on the portable media player 14 after deleted song files are taken into effect. At operation 144 the base unit 12 determines the amount of file storage space used for new song files that have been recorded since the last synchronization operation. At operation 146 a check is made to see if the memory of the portable media player 14 is full with all stored song files being in the "Locked" condition (i.e., write-protected). If this condition is present, then a message is displayed such as "MEMORY FULL" on the base unit's 12 display 24a, at operation 148, and the synchronization operation is terminated.

If the check at operation 146 reveals that at least one song file is not "Locked", then at operation 150 a determination is made if the available (i.e., free) memory on the portable media player 14 is greater than the total file space of new song files stored on the base unit 12 since the previous synchronization operation. If not, then non-locked song files on the portable media player 14 are deleted sequentially at operation 152, in accordance with FIFO protocol, and operation 150 is repeated until sufficient memory space becomes available to accommodate all of the new song files stored on the base unit 12 since the last synchronization operation.

When the inquiry at operation 150 produces a "Yes" answer, then all new song files stored on the base unit 12 are uploaded to the portable media player 14, as indicated at operation 154. A check is then made at operation 156 if the synchronization operation is complete, that is if all of the new song files from the base unit 12 have been uploaded to the portable media player 14. If they have not, then operations 154 and 156 are repeated. If they have, then the message "DONE" may be displayed on the base unit's 12 display 24a at operation 158, and the synchronization operation is complete.

It will also be appreciated that some FM stations (as well as satellite radio broadcasts) supply information on the title of a song as the song is being broadcast, which would make it easy for the controllers 40 and 82 to determine if a given song stored on the base unit 12 is actually a "new" song that is not stored on the player 14. This technology is presently available in HD radio as well as RDS (Radio Data System) technology.

At any time the recording of media on the base unit 12 may be interrupted by the user if the user wishes to begin listening to songs stored on the base unit 12. This is accomplished simply by the user using the mode button Play/Pause button 24c on the base unit 12 to select the playback of song files on the base unit 12.

When the portable media player 14 is docked on the base unit 12, the Lock/Unlock button 24b of the base unit 12 may be the control that is used to control locking and unlocking of media files. All other controls (e.g., volume, play/pause, next track, previous track) on the base unit 12 operate as previously described, essentially as if the portable media player 14 was not attached to the base unit 12. Charging of the rechargeable battery 14a may be accomplished by supplying a suitable charging current through its connection to the docking port 26. Alternatively, charging of the rechargeable battery 14a may be accomplished via a separate charging cable (not shown) that may be coupled to the connection port 90 of the portable media player 14 and also to a standard conventional recharger device that plugs into an AC line (e.g., 120 volt/60 Hz) power source. Alternatively, recharging could be done from a 12 volt power source, such as an accessory power port in a motor vehicle, via a suitable cable. Any of the above recharging arrangements allow the portable media player 14 to be quickly and easily recharged.

The connection port 90 could also be used for coupling a suitable external cable to the portable media player 14 so that media content stored on the player can be directed to a "Line Input" jack of an external device, for example a car audio system, a home audio system, or any other form of playback system.

The system 10 thus forms an easily operated system that monitors incoming media content from a variety of media sources, detects those portions of the incoming content that are desired to be saved by the user, records those portions of the incoming media content, and allows the stored portions of incoming media content to be replayed on a base type device or uploaded onto a hand holdable portable media player. A principal advantage of the system 10 is its ease of use. The user may simply turn on the base unit 12, select the input media source, whether that be an FM broadcasting source, internet radio source, satellite radio source, etc., and the base unit 12 will begin monitoring and analyzing the incoming media to create song files that it stores in its memory 54. No additional commands from the user are need for this operation to occur. When the user places the portable media player 14 in the docking port 26, the uploading of stored song files on the base unit 12 will begin. Recording of song files may occur regardless of the level that the volume control 34 is set to.

Still another significant feature is the ability of the base unit 12 to remove commercials and advertisements between songs and to save only the songs as independent song files on its memory 54. The controller 40 of the base unit 12 may also be programmed to automatically insert a predetermined dead space, for example 1-2 seconds of silence, between stored songs.

The base unit 12 may also function, with little or no modification, as a speaker phone for any compatible phone or mobile phone device. The portable media player 14 may be adapted, with little or not modification, to connect to factory car radios and may wirelessly connect to compatible receivers, for example using short range wireless connectivity standards such as the BLUETOOTH® wireless connectivity standard.

It will be appreciated that while the system 10 has been described in connection with an application for storing broadcast media content in the form of music, and particularly song files, that the system 10 will lend itself with little or no modification to other significant applications. For example, the system 10 could be programmed to detect only commercials, and could save only the commercials that separate music from a given content source. This application may have be useful for various businesses, for exampling advertising agencies, seeking to examine/monitor their own advertisements as well as those of competitors that may occur from a given broadcast source.

While one or more specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A media system comprising:
    a base unit adapted to playback and record portions of media content being received from an external media source, the base unit having:
        a controller;
        a memory forming a non-removable portion of the base unit; and
        a gap detection software module for analyzing the media content as the media content is received by the base unit in a streaming format, and determining a start point and an end point for sections of the media content being received that represent commercial advertisements which are not to be recorded, and denoting remaining portions of the media content as designated portions that are to be stored as new media files;
    a portable media player adapted to be docked to the base unit and to communicate with the base unit;
    the base unit further being adapted to store the designated portions of the media content in a memory as the new media files when the portable media player is not docked on the base unit;
    the controller further being configured to upload the new media files stored thereon to the portable media player after the portable media player is docked on the base unit.

2. The media system of claim 1, wherein the new media files comprise audio files that are able to be played back by the base unit or the portable media player.

3. The media system of claim 1, wherein the base unit is configured to automatically delete an oldest one of the media files when the memory is one of full or almost full, to make room for a new one of the new media files.

4. The media system of claim 1, wherein the base unit includes a control adapted to allow a user to designate one of the new media files that is being played back on the base unit as a locked song file that is not to be deleted after it is uploaded to the portable media player.

5. The media system of claim 1, wherein the portable media player includes:
    a memory for storing the new media files uploaded from the base unit; and
    a control adapted to allow a user to designate one of the new media files that is being played back on the portable media player as a locked new media file, thereafter preventing the locked new media file from being deleted from the portable media player.

6. A media system comprising:
    a base unit adapted to receive media content from an external media content source, the media content having first portions and second portions intermittently dispersed between the first portions;
    the base unit including:
        a docking port;
        a controller;
        a memory forming a non-removable portion of the base unit;
        a gap detection software module for detecting a starting point and an ending point of each of the second portions in the media content being received by the base unit from the external source, the second portions representing commercial advertisements, and the controller further using the gap detection software module to filter out the second portions of the media content and to store, in the memory, only the first portions of the media content as new media files in the memory;
    a portable media player including:
        a rechargeable battery;
        a memory; and
        the portable media player adapted to be removably electrically coupled to the base unit via the docking port; and
    the controller of the base unit further being configured to determine when the portable media player has been coupled to the docking port of the base unit, to determine available space in the memory of the portable media player, and to upload the new media files in the memory of the base unit to the memory of the portable media player for subsequent playback on the portable media player by a user.

7. The system of claim 6, wherein the base unit includes an amplifier and at least one speaker for playing media content that is being input to the base unit as an audio signal.

8. The system of claim 6, wherein the base unit includes a playback mode to allow playback of the new media files as audio files.

9. The system of claim 6, wherein the controller of the base unit controls storage of the new media files being created from the media content so that an oldest one of the new media files is deleted to make room for a newly recorded new media file when the memory of the base unit becomes full.

10. The system of claim 6, wherein the base unit includes a control that enables a user to designate one of the new media files that is currently playing back on the base unit, as a specific new media file that is not to be deleted after it is uploaded to the portable media player.

11. The system of claim 6, wherein the base unit includes a control that allows the user to delete one of the new media files that is currently being played back on the base unit from the memory of the base unit.

12. The system of claim 6, wherein the media files stored in the memory of the base unit comprise audio files.

13. The system of claim 6, wherein the portable media player includes a control that enables a user to lock a currently playing new media file to protect the currently playing new media file against deletion or being overwritten.

14. The system of claim 6, wherein uploading of the new media files from the memory of the base unit to the memory of the portable media player begins automatically when the portable media player is docked in the docking port of the base unit while the base unit is powered on.

15. An apparatus adapted to receive media content from a media content source, the apparatus comprising;
    a controller;
    a docking port;
    a memory in communication with the controller, memory being non-removable from the apparatus;
    a gap detection software module used by the controller for detecting a starting point and an ending point of each commercial advertisement segment in the media content being received by the apparatus, the controller using the gap detection software module to filter out the commercial advertisements from the media content and to store only remaining portions of media content new media files;

a playback control for initiating playback of the new media files;

a control for allowing a user to designate specific ones of said new media files that are not to be deleted; and the controller further adapted to facilitate uploading of the new media files to an external device when the external device is detected by the controller as being connected to the docking port.

16. The apparatus of claim 15, wherein the controller operates to delete a specific one or more of the new media files in accordance with a first-in-first-out (FIFO) protocol when insufficient memory space is available in the memory to store a most recently obtained new media file.

17. The apparatus of claim 15, further comprising a portable media player adapted to be coupled to the docking port of the apparatus and to receive uploaded new media files from the apparatus.

18. The apparatus of claim 17, wherein the new media files that have been designated as those not to be deleted are recognized by the portable media player as being write protected so as not to be capable of being over-written by a subsequently uploaded new media file.

19. A method for recording and playing back media content received from a media source, the method comprising:

using a base unit to receive and store media content from an external media source, the media content including first portions intermittently separated by second portions, the second portions representing commercial advertisements;

analyzing the media content to detect a starting point and an ending point of each of the second portions, and designating remaining portions of the media content as the first portions;

storing only the first portions as separate new media files in a non-removable, non-volatile memory of the base unit;

providing a first control for allowing a user to play back the new media files;

providing a second control for allowing the user to designate specific ones of the new media files stored in the non-volatile memory of the base unit that are not to be deleted;

placing a portable media player in communication with the base unit; and uploading the new media files stored on the base unit to a memory of the portable media player for future playback on the portable media player.

* * * * *